(12) United States Patent
Miura et al.

(10) Patent No.: US 10,899,195 B2
(45) Date of Patent: Jan. 26, 2021

(54) REFRIGERATION CYCLE DEVICE

(71) Applicant: DENSO CORPORATION, Kariya (JP)

(72) Inventors: Koji Miura, Kariya (JP); Yoshiki Kato, Kariya (JP); Nobuyuki Hashimura, Kariya (JP); Ariel Marasigan, Kariya (JP)

(73) Assignee: DENSO CORPORATION, Kariya (JP)

( * ) Notice: Subject to any disclaimer, the term of this patent is extended or adjusted under 35 U.S.C. 154(b) by 209 days.

(21) Appl. No.: 16/082,294

(22) PCT Filed: Feb. 24, 2017

(86) PCT No.: PCT/JP2017/006965
§ 371 (c)(1),
(2) Date: Sep. 5, 2018

(87) PCT Pub. No.: WO2017/154602
PCT Pub. Date: Sep. 14, 2017

(65) Prior Publication Data
US 2019/0030989 A1 Jan. 31, 2019

(30) Foreign Application Priority Data
Mar. 8, 2016 (JP) .................................. 2016-044318

(51) Int. Cl.
*B60H 1/00* (2006.01)
*B60H 1/22* (2006.01)
(Continued)

(52) U.S. Cl.
CPC .......... *B60H 1/00907* (2013.01); *B60H 1/00* (2013.01); *B60H 1/00328* (2013.01);
(Continued)

(58) Field of Classification Search
CPC .................. B60H 1/00914; B60H 1/22; B60H 2001/00928; B60H 1/00328; B60H 1/00342
See application file for complete search history.

(56) References Cited

U.S. PATENT DOCUMENTS 6,347,528 B1 * 2/2002 Iritani ................ B60H 1/00357
62/324.6
10,168,079 B2 * 1/2019 Takeuchi .................. F25B 6/04
(Continued)

FOREIGN PATENT DOCUMENTS

JP 2006321389 A 11/2006
JP 2010243001 A 10/2010
(Continued)

OTHER PUBLICATIONS

Fang GuiYin, "Practical New Technology of Refrigeration Air-conditioning Steps", RenMin YuDian Chubanshe, May 2000, with partial translation.

*Primary Examiner* — Paul Alvare
(74) *Attorney, Agent, or Firm* — Harness, Dickey & Pierce, P.L.C.

(57) ABSTRACT

A refrigeration cycle device includes a high-pressure side heat exchanger, a low-pressure side heat exchanger, a temperature-adjustment target device to be temperature-adjusted with a high-pressure side refrigerant, an exterior heat exchanger exchanging heat between the high-pressure side refrigerant or a low-pressure side refrigerant and outside air, a switching portion configured to switch between a heat dissipation mode in which the high-pressure side refrigerant dissipates heat into the outside air in the exterior heat exchanger and a heat absorption mode in which the low-pressure side refrigerant absorbs heat from the outside air in the exterior heat exchanger, a cooling request operation portion, and a controller configured to control an operation (Continued)

of the switching portion to perform the heat absorption mode when the cooling request operation portion operates to request cooling of the air and the temperature-adjustment target device needs to be warmed up.

20 Claims, 7 Drawing Sheets

(51) Int. Cl.
| | |
|---|---|
| F25B 5/04 | (2006.01) |
| B60H 1/32 | (2006.01) |
| F25B 1/00 | (2006.01) |
| F01P 3/20 | (2006.01) |
| F25B 29/00 | (2006.01) |
| G06F 9/48 | (2006.01) |

(52) U.S. Cl.
CPC ..... *B60H 1/00342* (2013.01); *B60H 1/00557* (2013.01); *B60H 1/22* (2013.01); *B60H 1/32* (2013.01); *B60H 1/3213* (2013.01); *B60H 1/32284* (2019.05); *F01P 3/20* (2013.01); *F25B 1/00* (2013.01); *F25B 5/04* (2013.01); *F25B 29/00* (2013.01); *B60H 2001/3267* (2013.01); *G06F 9/4893* (2013.01)

(56) References Cited

U.S. PATENT DOCUMENTS

| | | | |
|---|---|---|---|
| 2004/0216483 A1* | 11/2004 | Inaba | F02G 5/04 62/498 |
| 2006/0005557 A1* | 1/2006 | Takano | B60H 1/3204 62/238.6 |
| 2006/0144047 A1* | 7/2006 | Inaba | F25B 6/04 60/618 |
| 2007/0289326 A1* | 12/2007 | Nishikawa | F02G 5/04 62/498 |
| 2012/0255319 A1 | 10/2012 | Itoh et al. | |
| 2015/0052913 A1* | 2/2015 | Smith | B60H 1/00921 62/79 |
| 2015/0159933 A1 | 6/2015 | Itoh et al. | |
| 2015/0298522 A1 | 10/2015 | Hirabayashi et al. | |
| 2016/0116197 A1* | 4/2016 | Takeuchi | F25B 5/04 62/276 |

FOREIGN PATENT DOCUMENTS

| | | |
|---|---|---|
| JP | 2013002710 A | 1/2013 |
| JP | 2014037959 A | 2/2014 |
| JP | 2015203394 A | 11/2015 |

* cited by examiner

REFRIGERATION CYCLE DEVICE

CROSS REFERENCE TO RELATED APPLICATIONS

This application is a U.S. National Phase Application under 35 U.S.C. 371 of International Application No. PCT/JP2017/006965 filed on Feb. 24, 2017 and published in Japanese as WO/2017/154602 A1 on Sep. 14, 2017. This application is based on and claims the benefit of priority from Japanese Patent Application No. 2016-044318 filed on Mar. 8, 2016. The entire disclosures of all of the above applications are incorporated herein by reference.

FIELD OF THE INVENTION

The present disclosure relates to a refrigeration cycle device including an exterior heat exchanger.

BACKGROUND ART

Conventionally, for example, Patent Document 1 describes a heat pump system that includes an engine-cooling system, an air conditioner, and a heat exchanger.

The engine-cooling system is configured to be capable of cooling an engine by circulating a coolant in a coolant passage. When the temperature of the coolant is higher than the temperature of an engine, the engine can be warmed up more rapidly by circulating the coolant.

The air conditioner is configured to be capable of executing an air-heating operation or air-cooling operation by circulating a refrigerant in a refrigerant passage. A compressor, the heat exchanger, an expansion valve, an outdoor unit, another expansion valve, and an evaporator are provided in the refrigerant passage. The heat exchanger exchanges heat between the engine-cooling system and the air conditioner.

During the air-heating operation, a high-temperature and high-pressure refrigerant compressed by the compressor dissipates heat into a coolant within the engine-cooling system through heat exchange in the heat exchanger. The warmed coolant dissipates heat in a heater core to perform air-heating of the vehicle interior. The refrigerant is decompressed and expanded by the expansion valve to be temporarily cooled and then reaches the outdoor unit. The outdoor unit functions as a heat absorber that causes the low-temperature refrigerant to absorb heat during the air-heating operation.

Such a heat pump system can execute engine warming-up control to warm a coolant of the engine through heat exchange in the heat exchanger. Furthermore, after the completion of the warming-up of the engine, the coolant can also be warmed using heat of the engine.

During the air-cooling operation, a high-temperature and high-pressure refrigerant compressed by the compressor reaches the outdoor unit. The outdoor unit functions as a heat radiator that dissipates heat from the high-temperature refrigerant during the air-cooling operation. The refrigerant cooled by the outdoor unit is further cooled by the expansion valve. Then, the evaporator exchanges heat between the refrigerant and air to be blown into the vehicle interior, thus cooling the air into the vehicle interior.

RELATED ART DOCUMENT

Patent Document

[Patent Document 1] Japanese Unexamined Patent Application Publication No. 2015-203394

SUMMARY OF INVENTION

According to the studies conducted by the inventors of the present application, in the related art mentioned above, the high-temperature refrigerant dissipates heat in the outdoor unit during an air-cooling operation, so that the amount of heat that can be dissipated from the refrigerant into the coolant of the engine-cooling system in the heat exchanger is lessened correspondingly. For this reason, during the air-cooling operation, an engine warming-up capacity is reduced, thereby making it difficult to achieve both the air-cooling and the warming-up of the engine simultaneously.

In other words, such a heat pump system in the related art disadvantageously has difficulty in achieving both the cooling of air to be blown into the vehicle interior and the warming-up of a temperature-adjustment target device, which has its temperature adjusted with heat of the refrigerant.

In view of the forgoing matter, it is an object of the present application to achieve both cooling of air, which is to be blown into a space, and warming-up of a temperature-adjustment target device.

A refrigeration cycle device according to an aspect of the present disclosure includes: a high-pressure side heat exchanger that causes a high-pressure side refrigerant to dissipate heat; a low-pressure side heat exchanger that causes a low-pressure side refrigerant to directly or indirectly absorb heat from air which is to be blown into a space to be air-blown; a temperature-adjustment target device to be temperature-adjusted with heat of the high-pressure side refrigerant; an exterior heat exchanger that exchanges heat between the high-pressure side refrigerant or the low-pressure side refrigerant and outside air; a switching portion that is configured to switch between a heat dissipation mode in which the high-pressure side refrigerant dissipates heat into the outside air in the exterior heat exchanger, and a heat absorption mode in which the low-pressure side refrigerant absorbs heat from the outside air in the exterior heat exchanger; a cooling request operation portion configured to be operated by an occupant to request cooling of air to be blown into the space to be air-blown, by using the low-pressure side heat exchanger; and a controller configured to control an operation of the switching portion to perform the heat absorption mode when the cooling request operation portion operates to request cooling of the air to be blown into the space to be air-blown and the temperature-adjustment target device needs to be warmed up.

With this configuration, the low-pressure side refrigerant in the refrigeration cycle can absorb heat in both the exterior heat exchanger and the low-pressure side heat exchanger when the air to be blown into the space to be air-blown needs to be cooled and the temperature-adjustment target device needs to be warmed up.

Thus, the air to be blown into the vehicle interior can be cooled, and the capacity of warming up the temperature-adjustment target device can be enhanced, as compared to a case where the refrigerant dissipates heat into the outside air only in the exterior heat exchanger. Consequently, both the cooling of the air to be blown into the space to be air-blown and the warming-up of the temperature-adjustment target device can be achieved.

DESCRIPTION OF EMBODIMENTS

Figure 1:
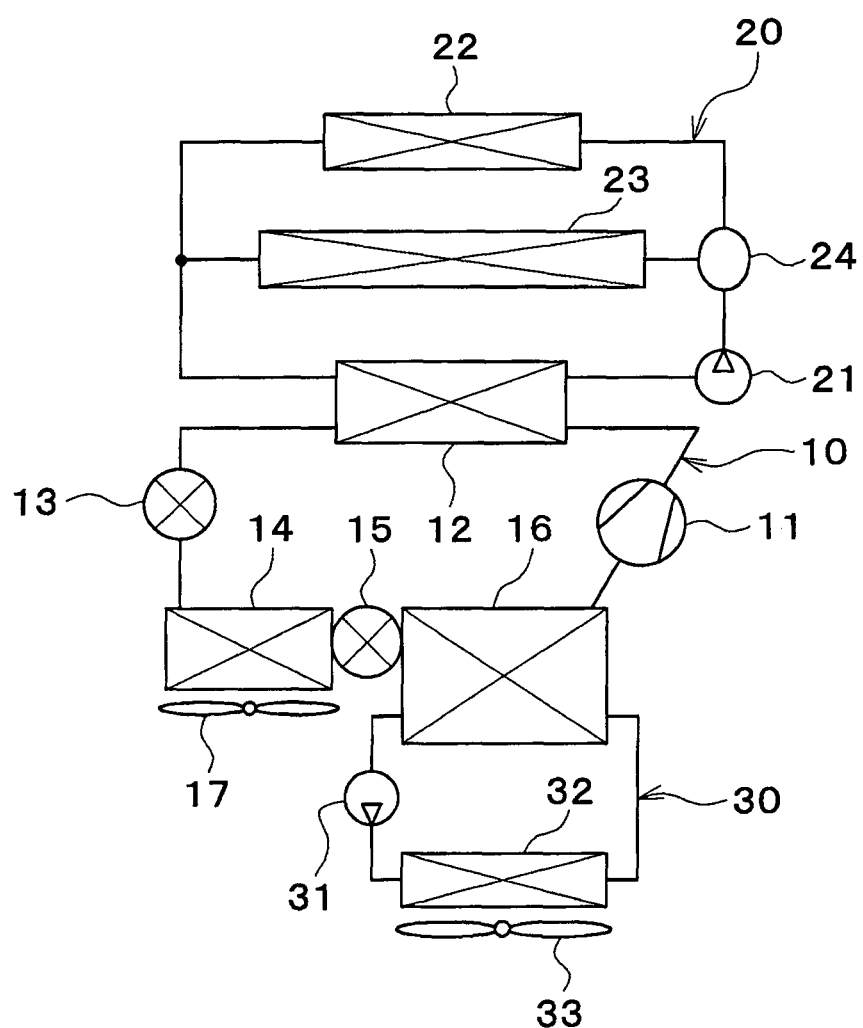
FIG. 1 is an entire configuration diagram showing a refrigeration cycle device in a first embodiment.

Hereinafter, embodiments will be described with reference to the accompanying drawings. In the respective embodiments below, the same or equivalent parts are indicated by the same reference characters throughout the figures.

First Embodiment

A refrigeration cycle device shown in FIG. 1 is a vehicle refrigeration cycle device used to adjust a vehicle-mounted device or an interior space of the vehicle (in other words, a space to be air-blown) to an appropriate temperature. In the present embodiment, the refrigeration cycle device is used in a hybrid vehicle that obtains a driving force for vehicle traveling from both an engine (in other words, an internal combustion engine) and a traveling electric motor.

The hybrid vehicle in the present embodiment is configured as a plug-in hybrid vehicle that is capable of charging a battery (in other words, a vehicle-mounted battery) mounted on the vehicle with power supplied from an external power source (in other words, a commercial power source) when the vehicle is stopped. For example, a lithium ion battery can be used as the battery.

The driving force output from the engine is used not only to cause the vehicle to travel, but also to operate a power generator. The power generated by the power generator and the power supplied from the external power source can be stored in the battery. The power stored in the battery is supplied not only to the traveling electric motor, but also to various vehicle-mounted devices, including electric components configuring the refrigeration cycle device.

A refrigeration cycle 10 is a vapor compression refrigerator that includes a compressor 11, a high-pressure side heat exchanger 12, a first expansion valve 13, an exterior heat exchanger 14, a second expansion valve 15, and a low-pressure side heat exchanger 16. The refrigeration cycle 10 in the present embodiment configures a subcritical refrigeration cycle in which a high-pressure side refrigerant pressure does not exceed the critical pressure of the refrigerant, using a fluorocarbon refrigerant as the refrigerant.

The compressor 11 is an electric compressor driven by power supplied from a battery, or a belt-driven compressor driven by a belt. The compressor 11 draws, compresses, and discharges the refrigerant in the refrigeration cycle 10.

The high-pressure side heat exchanger 12 is a condenser that condenses a high-pressure side refrigerant by exchanging heat between the high-pressure side refrigerant discharged from the compressor 11 and the coolant in a high-temperature coolant circuit 20.

The coolant in the high-temperature coolant circuit 20 is a fluid serving as a heat medium. The coolant in the high-temperature coolant circuit 20 is the high-temperature heat medium. The high-temperature coolant circuit 20 is a heat-medium circuit through which the high-temperature heat medium circulates. In the present embodiment, the coolant suitable for use in the high-temperature coolant circuit 20 is a liquid containing at least ethylene glycol, dimethylpolysiloxane, or a nanofluid, or an antifreezing fluid.

The first expansion valve 13 is a first decompression device that decompresses and expands a liquid-phase refrigerant flowing out of the high-pressure side heat exchanger 12. The first expansion valve 13 is an electric variable throttle mechanism that has a valve body and an electric actuator. The valve body is configured to be capable of changing a passage opening degree (in other words, a throttle opening degree) of a refrigerant passage. The electric actuator has a stepping motor for changing the throttle opening degree of the valve body.

The first expansion valve 13 is configured as a variable throttle mechanism with a full-opening function that fully opens the refrigerant passage when the throttle opening degree is fully opened. That is, the first expansion valve 13 can prevent a decompression function of the refrigerant from being exerted by fully opening the refrigerant passage. The first expansion valve 13 has its operation controlled by a control signal output from a controller 40 shown in FIG. 2.

The exterior heat exchanger 14 is a refrigerant outside-air heat exchanger that exchanges heat between the refrigerant flowing out of the first expansion valve 13 and the outside air. The exterior heat exchanger 14 receives the outside air blown by an exterior blower 17.

The exterior blower 17 is a blowing portion that blows the outside air toward the exterior heat exchanger 14. The exterior blower 17 is an electric blower that includes a fan driven by an electric motor. The exterior blower 17 is an air-flow adjusting portion that adjusts the flow speed of the outside air flowing into the exterior heat exchanger 14.

The exterior heat exchanger 14 and the exterior blower 17 are disposed at the forefront of the vehicle. Thus, traveling air is allowed to hit the exterior heat exchanger 14 during traveling of the vehicle.

When the temperature of the refrigerant circulating through the exterior heat exchanger 14 is lower than the outside air temperature, the exterior heat exchanger 14 functions as a heat absorber that absorbs heat from the outside air into the refrigerant. When the temperature of the refrigerant circulating through the exterior heat exchanger 14 is higher than the outside air temperature, the exterior heat exchanger 14 functions as a heat radiator that dissipates heat from the refrigerant into the outside air.

The second expansion valve 15 is a second decompression device that decompresses and expands the liquid-phase refrigerant flowing out of the exterior heat exchanger 14. The second expansion valve 15 is an electric variable throttle mechanism and has a valve body and an electric actuator. The valve body is configured to be capable of changing a passage opening degree (in other words, a throttle opening degree) of the refrigerant passage. The electric actuator has a stepping motor for changing the throttle opening degree of the valve body.

The second expansion valve 15 is configured of a variable throttle mechanism with a full-opening function that fully opens the refrigerant passage when its throttle opening degree is fully opened. That is, the second expansion valve 15 can prevent the decompression function of the refrigerant from being exerted by fully opening the refrigerant passage. The second expansion valve 15 has its operation controlled by a control signal output from the controller 40 shown in FIG. 2.

The throttle opening degrees of the first expansion valve 13 and the second expansion valve 15 are changed to switch between a heat absorption mode and a heat dissipation mode. The heat absorption mode is an operation mode in which the refrigerant absorbs heat from the outside air in the exterior heat exchanger 14. The heat dissipation mode is an operation mode in which the refrigerant dissipates heat into the outside air, in the exterior heat exchanger 14.

The low-pressure side heat exchanger 16 is an evaporator that evaporates a low-pressure refrigerant by exchanging heat between the low-pressure refrigerant flowing out of the second expansion valve 15 and the coolant in a low-temperature coolant circuit 30. The gas-phase refrigerant evaporated at the low-pressure side heat exchanger 16 is drawn into and compressed by the compressor 11.

The coolant in the low-temperature coolant circuit 30 is a fluid serving as a heat medium. The coolant in the low-temperature coolant circuit 30 is the low-temperature heat medium. The low-temperature coolant circuit 30 is a heat-medium circuit through which the low-temperature heat medium circulates. In the present embodiment, the coolant suitable for use in the low-temperature coolant circuit 30 is a liquid containing at least ethylene glycol, dimethylpolysiloxane, or a nanofluid, or an antifreezing fluid.

The high-pressure side heat exchanger 12, a high-temperature side pump 21, a heater core 22, an engine 23, and a flow-rate adjustment valve 24 are disposed in the high-temperature coolant circuit 20. The high-temperature side pump 21 is a heat medium pump that draws and discharges the coolant. The high-temperature side pump 21 is an electric pump. The high-temperature side pump 21 is a flow rate adjusting portion that adjusts the flow rate of the coolant circulating in the high-temperature coolant circuit 20.

The heater core 22 is a heating heat exchanger that heats air to be blown into the vehicle interior (in other words, a space to be air-blown) by exchanging heat between the coolant in the high-temperature coolant circuit 20 and the air to be blown into the vehicle interior. In the heater core 22, the coolant undergoes sensible heat change to dissipate heat into the air, which is to be blown into the vehicle interior. That is, in the heater core 22, the coolant does not change its phase and remains in the liquid phase even though the coolant dissipates heat into the air to be blown into the vehicle interior.

The engine 23 is a temperature-adjustment target device, the temperature of which is adjusted by the coolant in the high-temperature coolant circuit 20. The heater core 22 and the engine 23 are arranged in parallel with each other in the flow of the coolant.

The flow-rate adjustment valve 24 is a flow-rate ratio adjusting portion that adjusts a flow-rate ratio of the coolant flowing through the heater core 22 to the coolant flowing through the engine 23. The flow-rate adjustment valve 24 is a supply ratio adjusting portion that adjusts a supply ratio of heat of the high-pressure side refrigerant in the refrigeration cycle 10 by adjusting the flow-rate ratio of the coolant between the engine 23 and the heater core 22.

The high-temperature side pump 21 and the flow-rate adjustment valve 24 are high-pressure side flow-rate adjusting portions that adjust the flow rate of the coolant circulating through the high-pressure side heat exchanger 12. The high-temperature side pump 21 and the flow-rate adjustment valve 24 are temperature-adjustment flow rate adjusting portions that adjust the flow rate of the coolant circulating through the engine 23. The high-temperature side pump 21 and the flow-rate adjustment valve 24 are heat-exchange amount adjusting portions that adjust the heat exchange amount in the heater core 22 by adjusting the flow rate of the coolant flowing through the heater core 22.

The low-pressure side heat exchanger 16, a low-temperature side pump 31, and a cooler core 32 are disposed in the low-temperature coolant circuit 30. The low-temperature side pump 31 is a heat medium pump that draws and discharges the coolant. The low-temperature side pump 31 is an electric pump. The low-temperature side pump 31 is a low-temperature side flow rate adjusting portion that adjusts the flow rate of the coolant circulating in the low-temperature coolant circuit 30.

The cooler core 32 is a low-temperature side heat medium heat exchanger that cools air to be blown into the vehicle interior by exchanging heat between the coolant in the low-temperature coolant circuit 30 and the air to be blown into the vehicle interior. Therefore, the low-pressure side heat exchanger 16 causes the low-pressure side refrigerant in the refrigeration cycle 10 to indirectly absorb heat from the air to be blown into the vehicle interior.

In the cooler core 32, the coolant undergoes sensible heat change to absorb heat from the air, which is to be blown into the vehicle interior. That is, in the cooler core 32, the coolant does not change its phase and remains in the liquid phase even though the coolant absorbs heat from the air to be blown into the vehicle interior.

The cooler core 32 and the heater core 22 are accommodated in an air conditioning casing (not shown). The air conditioning casing is an air passage formation member that forms an air passage. The air conditioning casing is disposed inside an instrument panel (not shown) located at the foremost part of the vehicle interior. The heater core 22 is disposed on the air-flow downstream side of the cooler core 32 in the air passage within the air conditioning casing.

An inside/outside air switching box (not shown) and an interior blower 33 are disposed in the air conditioning casing. The inside/outside air switching box is an inside/outside air switching portion that switches between the inside air and the outside air to introduce the switched air into the air passage of the air-conditioning casing. The interior blower 33 draws in and blows the inside air and the outside air introduced into the air passage in the air conditioning casing by the inside/outside air switching box.

An air mix door (not shown) is disposed between the cooler core 32 and the heater core 22 in the air passage within the air conditioning casing. The air mix door is an air volume ratio adjusting portion that adjusts the air volume ratio of the cold air flowing into the heater core 22 to the cold air bypassing the heater core 22, in the cold air passing through the cooler core 32. The operation of the air mix door is controlled by the controller 40.

The air conditioning casing is provided with an air outlet (not shown). The conditioned air adjusted to a desired temperature by the air mix door is blown into the vehicle interior through the air outlet.

Figure 2:
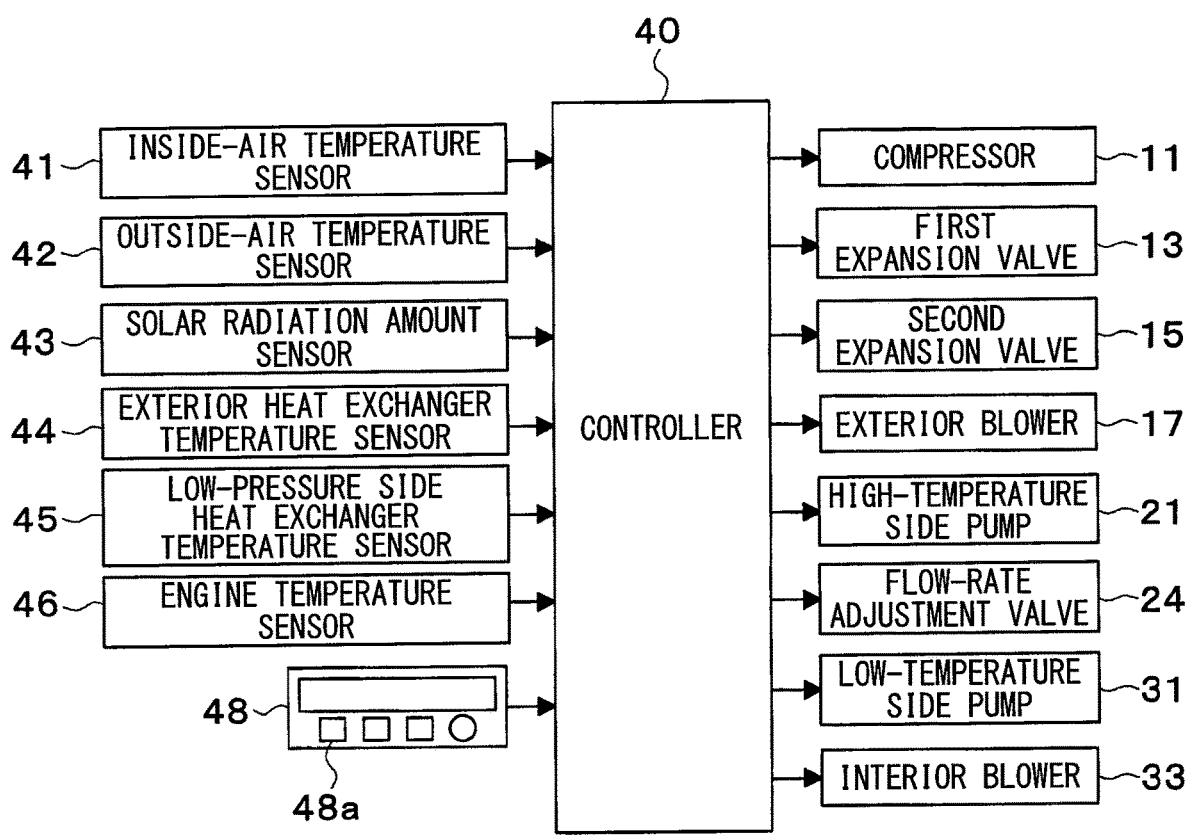
FIG. 2 is a block diagram showing an electric control unit of the refrigeration cycle device in the first embodiment.

Next, an electric control unit of the refrigeration cycle 10 will be described with reference to FIG. 2. The controller 40 is configured of a known microcomputer, including a CPU, a ROM, and a RAM, and a peripheral circuit thereof. The controller 40 performs various computations and processing based on control programs stored in the ROM. Various control target devices are connected to an output side of the controller 40. The controller 40 is a control unit that controls the operations of various control target devices.

The control target devices controlled by the controller 40 include the compressor 11, the first expansion valve 13, the second expansion valve 15, the exterior blower 17, the high-temperature side pump 21, the low-temperature side pump 31, and the interior blower 33.

The hardware and software of the controller 40 for controlling the electric motor of the compressor 11 correspond to a refrigerant discharge capacity control unit that controls a refrigerant discharge capacity of the compressor 11. The hardware and software of the controller 40 for controlling the first expansion valve 13 correspond to a first throttle control unit that controls the throttle opening degree of the first expansion valve 13. The hardware and software of the controller 40 for controlling the second expansion valve 15 correspond to a second throttle control unit that controls the throttle opening degree of the second expansion valve 15.

The hardware and software of the controller 40 for controlling the exterior blower 17 correspond to an outside-air blowing capacity control unit that controls an outside-air blowing capacity of the exterior blower 17.

The hardware and software of the controller 40 for controlling the high-temperature side pump 21 correspond to a high-temperature side heat medium flow rate control unit that controls the flow rate of the high-temperature side heat medium. The hardware and software of the controller 40 for controlling the low-temperature side pump 31 correspond to a low-temperature side heat medium flow rate control unit that controls the flow rate of the low-temperature side heat medium. The hardware and software of the controller 40 for controlling the interior blower 33 correspond to an interior blower control unit.

The input side of the controller 40 is connected to a group of various air-conditioning control sensors. The group of sensors includes an inside-air temperature sensor 41, an outside-air temperature sensor 42, a solar radiation amount sensor 43, an exterior heat exchanger temperature sensor 44, a low-pressure side heat exchanger temperature sensor 45, and an engine temperature sensor 46.

The inside-air temperature sensor 41 is an inside-air temperature detecting portion that detects an inside air temperature Tr (i.e., the vehicle interior temperature). The outside-air temperature sensor 42 is an outside-air temperature detecting portion that detects an outside air temperature Tam. The solar radiation amount sensor 43 is a solar radiation amount detecting portion that detects a solar radiation amount Ts in the vehicle interior. The exterior heat exchanger temperature sensor 44 is an exterior heat exchanger temperature detecting portion that detects a temperature of the exterior heat exchanger 14. For example, the exterior heat exchanger temperature sensor 44 detects a temperature of the refrigerant flowing into the exterior heat exchanger 14. The low-pressure side heat exchanger temperature sensor 45 detects a temperature of the coolant flowing out of the low-pressure side heat exchanger 16.

The engine temperature sensor 46 is an engine temperature detecting portion that detects a temperature of the engine 23. For example, the engine temperature sensor 46 detects a temperature of the refrigerant flowing into the engine 23.

An operation panel 48 is connected to the input side of the controller 40. The operation panel 48 is disposed near a dashboard at the front of the vehicle cabin and operated by an occupant. The operation panel 48 is provided with various operation switches. Operation signals from various operation switches are input to the controller 40.

Various operation switches provided on the operation panel 48 include an air conditioner switch 48a, a temperature setting switch, and the like. The air conditioner switch 48a sets an operation and stop of air-conditioning (i.e., operation and stop of the compressor 11). The air conditioner switch 48a is a cooling request operation portion that requests cooling of the air to be blown into the vehicle interior by using the low-pressure side heat exchanger 16. The temperature setting switch is a temperature setting operation portion that sets a preset temperature of the vehicle interior.

Next, the operation of the above-mentioned structure will be described. The controller 40 determines an operating mode of the vehicle refrigeration cycle device when the compressor 11 is operating by turning on the air conditioner switch 48a on the operation panel 48. The controller 40 determines the operating mode of the vehicle refrigeration cycle device based on the necessity of warming up the engine 23, a target air outlet temperature TAO, and the like.

The necessity of warming up the engine 23 is determined based on a detected temperature obtained by the engine temperature sensor 46, i.e., the temperature of the engine 23. For example, when the temperature of the engine 23 is lower than a predetermined temperature, it is determined that the engine 23 needs to be warmed up.

The target air outlet temperature TAO is a target temperature of air blown into the vehicle interior. The controller 40 calculates the target air outlet temperature TAO based on the following formula.

$$TAO = Kset \cdot Tset - Kr \cdot Tr - Kam \cdot Tam - Ks \cdot Ts + C$$

where Tset is a vehicle interior preset temperature set by the temperature setting switch on the operation panel 48; Tr is an inside air temperature detected by the inside-air temperature sensor 41; Tam is an outside air temperature detected by the outside-air temperature sensor 42; Ts is an amount of solar radiation detected by the solar radiation amount sensor 43; Kset, Kr, Kam, and Ks are control gains; and C is a constant for correction.

The controller 40 executes an air-cooling mode when the engine 23 does not need to be warmed up and the target air outlet temperature TAO is lower than the inside air temperature Tr. The air-cooling mode is a heat dissipation mode in which the high-pressure side refrigerant in the refrigeration cycle 10 dissipates heat into the outside air, in the exterior heat exchanger 14.

In the air-cooling mode, the controller 40 sets the first expansion valve 13 in a fully open state and the second expansion valve 15 in a throttle state. In the air-cooling mode, the controller 40 stops the high-temperature side pump 21 and drives the low-temperature side pump 31.

The controller 40 determines a throttle opening degree of the second expansion valve 15 such that a subcooling degree of the refrigerant flowing into the second expansion valve 15 approaches a predetermined target subcooling degree, or that the superheat degree of the refrigerant flowing into the compressor 11 approaches a predetermined target superheat degree. The target subcooling degree and the target superheat degree are determined such that a coefficient of performance (so-called COP) of the cycle approaches its maximum value.

In the air-cooling mode, the high-pressure refrigerant discharged from the compressor 11 flows into the high-pressure side heat exchanger 12. As the high-temperature side pump 21 is stopped at this time, the coolant in the high-temperature coolant circuit 20 does not circulate through the high-pressure side heat exchanger 12. Thus, the refrigerant flowing into the high-pressure side heat exchanger 12 hardly exchanges heat with the coolant in the high-temperature coolant circuit 20 and flows out of the high-pressure side heat exchanger 12.

The refrigerant flowing out of the high-pressure side heat exchanger 12 flows into the first expansion valve 13. Because the first expansion valve 13 fully opens the refrigerant passage at this time, the refrigerant flowing out of the high-pressure side heat exchanger 12 flows into the exterior heat exchanger 14 without being decompressed by the first expansion valve 13.

The refrigerant flowing into the exterior heat exchanger 14 dissipates heat at the exterior heat exchanger 14 into the outside air blown by the exterior blower 17.

The refrigerant flowing out of the exterior heat exchanger 14 flows into the second expansion valve 15 to be decompressed and expanded into a low-pressure refrigerant in the second expansion valve 15. The low-pressure refrigerant decompressed in the second expansion valve 15 flows into the low-pressure side heat exchanger 16 and absorbs heat from the coolant in the low-temperature coolant circuit 30 to evaporate. Thus, the coolant in the low-temperature coolant circuit 30 is cooled, so that the air blown by the interior blower 33 is cooled by the cooler core 32.

Subsequently, the refrigerant flowing out of the low-pressure side heat exchanger 16 flows to the suction side of the compressor 11 to be decompressed again in the compressor 11.

As mentioned above, in the air-cooling mode, the air cooled by the cooler core 32 can be blown into the vehicle interior. Thus, the air-cooling of the vehicle interior can be achieved.

The controller 40 executes an air-heating mode when the engine 23 does not need to be warmed up and the target air outlet temperature TAO is higher than the inside air temperature Tr. The air-heating mode is a heat absorption mode in which the low-pressure side refrigerant in the refrigeration cycle 10 absorbs heat from the outside air in the exterior heat exchanger 14.

In the air-heating mode, the controller 40 sets the first expansion valve 13 in a throttle state and the second expansion valve 15 in the fully open state. In the air-heating mode, the controller 40 drives the high-temperature side pump 21 and stops the low-temperature side pump 31.

The controller 40 determines the throttle opening degree of the first expansion valve 13 such that the subcooling degree of the refrigerant flowing into the first expansion valve 13 approaches a predetermined target subcooling degree, or that the superheat degree of the refrigerant flowing into the compressor 11 approaches a predetermined target superheat degree.

The controller 40 determines the operating state of the air mix door such that the air mix door fully opens an air passage in the heater core 22, and that the whole flow of ventilation air having passed through the cooler core 32 passes through the air passage in the heater core 22.

In the air-heating mode, the high-pressure refrigerant discharged from the compressor 11 flows into the high-pressure side heat exchanger 12 and exchanges heat with the coolant in the high-temperature coolant circuit 20 to dissipate the heat. Thus, the coolant in the high-temperature coolant circuit 20 is heated.

The refrigerant flowing out of the high-pressure side heat exchanger 12 flows into the first expansion valve 13 to be decompressed into a low-pressure refrigerant. Then, the low-pressure refrigerant decompressed in the first expansion valve 13 flows into the exterior heat exchanger 14 and absorbs heat from the outside air blown by the exterior blower 17 to evaporate.

The refrigerant flowing out of the exterior heat exchanger 14 flows into the second expansion valve 15. At this time, as the second expansion valve 15 is in a fully open state, the refrigerant flowing out of the exterior heat exchanger 14 flows into the low-pressure side heat exchanger 16 without being decompressed by the second expansion valve 15.

Because the low-temperature side pump 31 is stopped, the coolant in the low-temperature coolant circuit 30 does not circulate through the low-pressure side heat exchanger 16. Thus, the low-pressure refrigerant flowing into the low-pressure side heat exchanger 16 hardly absorbs heat from the coolant in the low-temperature coolant circuit 30. Subsequently, the refrigerant flowing out of the low-pressure side heat exchanger 16 flows to the suction side of the compressor 11 to be decompressed again in the compressor 11.

As mentioned above, in the air-heating mode, heat of the high-pressure refrigerant discharged from the compressor 11 is dissipated at the high-pressure side heat exchanger 12 into the coolant in the high-temperature coolant circuit 20, and heat of the coolant in the high-temperature coolant circuit 20 is dissipated at the heater core 22 into the air to be blown into the vehicle interior, so that the heated air can be blown into the vehicle interior. Thus, the air-heating of the vehicle interior can be achieved.

The controller 40 executes an air-cooling warming-up mode when the engine 23 needs to be warmed up and the target air outlet temperature TAO is lower than the inside air temperature Tr. The air-cooling warming-up mode is a heat absorption mode in which the low-pressure side refrigerant in the refrigeration cycle 10 absorbs heat from the outside air in the exterior heat exchanger 14.

In the air-cooling warming-up mode, the controller 40 sets the first expansion valve 13 in a throttle state and the second expansion valve 15 in the fully open state. In the air-cooling warming-up mode, the controller 40 drives the high-temperature side pump 21 and the low-temperature side pump 31.

The controller 40 determines a throttle opening degree of the first expansion valve 13 such that a subcooling degree of the refrigerant flowing into the first expansion valve 13 approaches a predetermined target subcooling degree. The controller 40 determines an operating state of the flow-rate adjustment valve 24 such that the coolant flows to the engine 23.

In the air-cooling warming-up mode, the high-pressure refrigerant discharged from the compressor 11 flows into the high-pressure side heat exchanger 12 and dissipates heat by exchanging heat with the coolant in the high-temperature coolant circuit 20. Thus, the coolant in the high-temperature coolant circuit 20 is heated.

The refrigerant flowing out of the high-pressure side heat exchanger 12 flows into the first expansion valve 13 to be decompressed into a low-pressure refrigerant. Then, the low-pressure refrigerant decompressed in the first expansion valve 13 flows into the exterior heat exchanger 14 and absorbs heat from the outside air blown by the exterior blower 17 to evaporate.

The refrigerant flowing out of the exterior heat exchanger 14 flows into the second expansion valve 15. At this time, as the second expansion valve 15 is in a fully open state, the refrigerant flowing out of the exterior heat exchanger 14 flows into the low-pressure side heat exchanger 16 without being decompressed by the second expansion valve 15, and absorbs heat from the coolant in the low-temperature coolant circuit 30 to evaporate itself. That is, in the air-cooling warming-up mode, the refrigerant absorbs heat and evaporates in both the exterior heat exchanger 14 and the low-pressure side heat exchanger 16.

Thus, the coolant in the low-temperature coolant circuit 30 is cooled, so that the air blown by the interior blower 33 is cooled by the cooler core 32. Subsequently, the refrigerant flowing out of the low-pressure side heat exchanger 16 flows to the suction side of the compressor 11 to be decompressed again in the compressor 11.

As mentioned above, in the air-cooling warming-up mode, the air cooled by the cooler core 32 can be blown into the vehicle interior. Thus, the air-cooling of the vehicle interior can be achieved.

In the air-cooling warming-up mode, the heat of the high-pressure refrigerant discharged from the compressor 11 can be dissipated at the high-pressure side heat exchanger 12, into the coolant in the high-temperature coolant circuit 20, while the heat of the coolant in the high-temperature coolant circuit 20 can be dissipated into the engine 23. Thus, the warming-up of the engine 23 can be achieved.

The controller 40 executes an air-heating warming-up mode when the engine 23 needs to be warmed up and the target air outlet temperature TAO is higher than the inside air temperature Tr. The air-heating warming-up mode is a heat absorption mode in which the low-pressure side refrigerant in the refrigeration cycle 10 absorbs heat from the outside air in the exterior heat exchanger 14.

In the air-heating warming-up mode, the controller 40 sets the first expansion valve 13 in a throttle state, and the second expansion valve 15 in the fully open state. In the air-heating mode, the controller 40 drives the high-temperature side pump 21 and stops the low-temperature side pump 31.

The controller 40 determines a throttle opening degree of the first expansion valve 13 such that a subcooling degree of the refrigerant flowing into the first expansion valve 13 approaches a predetermined target subcooling degree. The controller 40 determines an operating state of the flow-rate adjustment valve 24 such that the coolant flows to the heater core 22 and the engine 23.

The controller 40 determines the operating state of the air mix door such that the air mix door fully opens an air passage in the heater core 22, and that the whole flow of ventilation air having passed through the cooler core 32 passes through the air passage in the heater core 22.

In the air-heating warming-up mode, the high-pressure refrigerant discharged from the compressor 11 flows into the high-pressure side heat exchanger 12 and dissipates heat by exchanging heat with the coolant in the high-temperature coolant circuit 20. Thus, the coolant in the high-temperature coolant circuit 20 is heated.

The refrigerant flowing out of the high-pressure side heat exchanger 12 flows into the first expansion valve 13 to be decompressed into a low-pressure refrigerant. Then, the low-pressure refrigerant decompressed in the first expansion valve 13 flows into the exterior heat exchanger 14 and absorbs heat from the outside air blown by the exterior blower 17 to evaporate.

The refrigerant flowing out of the exterior heat exchanger 14 flows into the second expansion valve 15. At this time, as the second expansion valve 15 is in a fully open state, the refrigerant flowing out of the exterior heat exchanger 14 flows into the low-pressure side heat exchanger 16 without being decompressed by the second expansion valve 15.

As the low-temperature side pump 31 is stopped, the coolant in the low-temperature coolant circuit 30 does not circulate through the low-pressure side heat exchanger 16.

Thus, the low-pressure refrigerant flowing into the low-pressure side heat exchanger 16 hardly absorbs heat from the coolant in the low-temperature coolant circuit 30. Subsequently, the refrigerant flowing out of the low-pressure side heat exchanger 16 flows to the suction side of the compressor 11 to be decompressed again in the compressor 11.

As mentioned above, in the air-heating warming-up mode, the heat of the high-pressure refrigerant discharged from the compressor 11 is dissipated at the high-pressure side heat exchanger 12, into the coolant in the high-temperature coolant circuit 20, while the heat of the coolant in the high-temperature coolant circuit 20 is dissipated at the heater core 22, into air to be blown into the vehicle interior, so that the heated air can be blown into the vehicle interior. Thus, the air-heating of the vehicle interior can be achieved.

Furthermore, in the air-heating warming-up mode, the heat of the coolant in the high-temperature coolant circuit 20 can be dissipated into the engine 23. Thus, the warming-up of the engine 23 can be achieved.

In the air-heating mode, the air-cooling warming-up mode, and the air-heating warming-up mode, by decreasing the throttle opening degree (in other words, a passage area) of the second expansion valve 15, the pressure of the exterior heat exchanger 14 increases, resulting in a small temperature difference from the outside air. Thus, a heat absorption amount in the exterior heat exchanger 14 is reduced.

In the air-heating mode, the air-cooling warming-up mode, and the air-heating warming-up mode, by increasing the throttle opening degree (in other words, a passage area) of the first expansion valve 13, the pressure of the exterior heat exchanger 14 increases, resulting in a small temperature difference from the outside air. Thus, a heat absorption amount in the exterior heat exchanger 14 is reduced.

In the air-heating mode, the air-cooling warming-up mode, and the air-heating warming-up mode, by decreasing a driving force (in other words, the rotational speed) of the exterior blower 17, the air flow speed of the outside air flowing through the exterior heat exchanger 14 is reduced. Thus, a heat absorption amount in the exterior heat exchanger 14 is reduced.

Therefore, the first expansion valve 13, the second expansion valve 15, and the exterior blower 17 are heat-exchange amount adjusting portions that adjust a heat exchange amount in the exterior heat exchanger 14. Specifically, in the heat absorption mode, the first expansion valve 13, the second expansion valve 15, and the exterior blower 17 are heat-absorption amount adjusting portions that adjust the heat absorption amount of heat absorbed by the low-pressure side refrigerant from the outside air in the exterior heat exchanger 14. The heat absorption mode is an operating mode in which the low-pressure side refrigerant in the refrigeration cycle 10 absorbs heat from the outside air in the exterior heat exchanger 14.

In this way, in the present embodiment, the controller 40 controls the operations of the first expansion valve 13 and the second expansion valve 15 to perform the heat absorption mode when the controller requests the air conditioner switch 48a to operate to cool the air to be blown into the vehicle interior and the engine 23 needs to be warmed up.

With this configuration, when the air to be blown into the vehicle interior is cooled and the engine 23 is warmed up, the low-pressure side refrigerant in the refrigeration cycle 10 can absorb heat in both the exterior heat exchanger 14 and the low-pressure side heat exchanger 16.

Thus, the air to be blown into the vehicle interior can be cooled, and the capacity of warming up the engine 23 can be enhanced, as compared to a case in which the refrigerant dissipates heat in the exterior heat exchanger 14 into the outside air. Consequently, both the cooling of the air to be blown into the vehicle interior and the warming-up of the engine 23 can be achieved simultaneously.

For example, the controller 40 controls an operation of at least one of the first expansion valve 13, the second expansion valve 15, and the exterior blower 17 to reduce the heat absorption amount of heat absorbed by the low-pressure side refrigerant from the outside air in the exterior heat exchanger 14 with elapse of time after the first expansion valve 13 and the second expansion valve 15 perform switching to the heat absorption mode.

Thus, as the warming-up of the engine 23 proceeds, the amount of heat supplied to the engine 23 is reduced so that the engine 23 can be suppressed from being excessively warmed up.

For example, the controller 40 controls the operations of the first expansion valve 13 and the second expansion valve 15 to switch to the heat dissipation mode when a predetermined time has elapsed since the first expansion valve 13 and the second expansion valve 15 perform switching to the heat absorption mode. The heat dissipation mode is an operating mode in which the high-pressure side refrigerant in the refrigeration cycle 10 dissipates heat at the exterior heat exchanger 14 into the outside air.

Thus, when the amount of heat required for warming-up of the engine 23 is reduced, the heat absorption amount of heat absorbed by the low-pressure side heat exchanger 16 is increased, thus making it possible to enhance a cooling capacity of air to be blown into the vehicle interior.

For example, the controller 40 controls the operation of the flow-rate adjustment valve 24 to increase a supply ratio of heat of the high-pressure side refrigerant with respect to the heater core 22 (specifically, the supply ratio of the coolant to the heater core 22) with elapse of time after the first expansion valve 13 and the second expansion valve 15 perform switching to the heat absorption mode.

Thus, immediately after switching to the heat absorption mode, the warming-up of the engine 23 is prioritized. Consequently, the warming-up of the engine 23 can be performed more rapidly.

For example, the controller 40 controls the operation of the flow-rate adjustment valve 24 to increase the heat exchange amount in the heater core 22 (specifically, the flow rate of the coolant flowing through the heater core 22) with elapse of time after the first expansion valve 13 and the second expansion valve 15 perform switching to the heat absorption mode.

Thus, the heating capacity of air to be blown into the vehicle interior can be enhanced as the amount of heat required for warming up the engine 23 is reduced.

For example, the controller 40 controls the operation of at least one of the high-temperature side pump 21 and the flow-rate adjustment valve 24 such that an absolute heat exchange amount of the heater core 22 rises through the ranks in comparison among the absolute heat exchange amounts of the high-pressure side heat exchanger 12, the exterior heat exchanger 14, the low-pressure side heat exchanger 16, and the heater core 22 with elapse of time after the first expansion valve 13 and the second expansion valve 15 perform switching to the heat absorption mode. Here, the term ranks of the absolute heat exchange amount refer to the ranks in descending order of the absolute heat exchange amount.

Thus, the heating capacity of air to be blown into the vehicle interior can be enhanced as the amount of heat required for warming-up of the engine 23 is reduced.

For example, the controller 40 controls the operation of at least one of the first expansion valve 13, the second expansion valve 15, and the exterior blower 17 such that an absolute heat exchange amount of the exterior heat exchanger 14 descends through the ranks in comparison among the absolute heat exchange amounts of the high-pressure side heat exchanger 12, the exterior heat exchanger 14, the low-pressure side heat exchanger 16, and the heater core 22 with elapse of time after the first expansion valve 13 and the second expansion valve 15 perform switching to the heat absorption mode. Here, the term ranks of the absolute heat exchange amount refer to the ranks in descending order of the absolute heat exchange amount.

Thus, as the warming-up of the engine 23 proceeds, the amount of heat absorbed into the low-pressure side refrigerant by the exterior heat exchanger 14 can be decreased, the capacity of the high-pressure side heat exchanger 12 can be suppressed from becoming excessive.

For example, the controller 40 controls the operation of the low-temperature side pump 31 such that an absolute heat exchange amount of the low-pressure side heat exchanger 16 rises through the ranks in comparison among the absolute heat exchange amounts of the high-pressure side heat exchanger 12, the exterior heat exchanger 14, the low-pressure side heat exchanger 16, and the heater core 22 with elapse of time after the first expansion valve 13 and the second expansion valve 15 perform switching to the heat absorption mode.

Thus, as the amount of moisture in the vehicle interior increases due to exhalation or perspiration of an occupant, the dehumidifying capability of the low-pressure side heat exchanger 16 can be enhanced to suppress an increase in the humidity of the vehicle interior.

In the present embodiment, the controller 40 controls the refrigerant discharge capacity of the compressor 11 depending on the heat exchange amount required for the low-pressure side heat exchanger 16. Specifically, the controller 40 controls the refrigerant discharge capacity of the compressor 11 such that the temperature of the low-pressure side heat exchanger 16 approaches a target temperature of the low-pressure side heat exchanger 16.

For example, in the heat absorption mode, the controller 40 controls the operation of at least one of the first expansion valve 13, the second expansion valve 15, and the exterior blower 17 to reduce the heat absorption amount of heat absorbed by the exterior heat exchanger 14 when the heat exchange amount in the low-pressure side heat exchanger 16 is determined to be less than the heat exchange amount required for the low-pressure side heat exchanger 16, even though the refrigerant discharge capacity of the compressor 11 is maximum. The case where the heat exchange amount in the low-pressure side heat exchanger 16 is determined to be less than the heat exchange amount required for the low-pressure side heat exchanger 16 refers to, for example, a case where a temperature of the low-pressure side heat exchanger 16 does not approach the target temperature of the low-pressure side heat exchanger 16.

Thus, when the refrigerant discharge capacity of the compressor 11 is maximum, the heat exchange amount in the low-pressure side heat exchanger 16 can be further increased, so that the heat exchange amount in the low-pressure side heat exchanger can be suppressed from becoming insufficient with respect to the required heat exchange amount.

For example, in the heat absorption mode, the controller 40 controls the operations of the first expansion valve 13 and the second expansion valve 15 to perform switching to the heat dissipation mode when the heat exchange amount in the low-pressure side heat exchanger 16 is determined to be less than the heat exchange amount required for the low-pressure side heat exchanger 16, even though the refrigerant discharge capacity of the compressor 11 is maxim urn.

Thus, when the refrigerant discharge capacity of the compressor 11 is maximum, the heat exchange amount in the low-pressure side heat exchanger 16 can be further increased, so that the heat exchange amount in the low-pressure side heat exchanger can be suppressed from becoming insufficient with respect to the required heat exchange amount.

For example, the controller 40 controls the operation of at least one of the high-temperature side pump 21 and the flow-rate adjustment valve 24 such that as the temperature of the coolant flowing into the high-pressure side heat exchanger 12 becomes higher, the flow rate of the coolant flowing through the high-pressure side heat exchanger 12 decreases.

Thus, even when the temperature of the coolant flowing into the high-pressure side heat exchanger 12 becomes high, the high-pressure side pressure in the refrigeration cycle 10 can be suppressed from increasing, thereby preventing excessive power consumption in the compressor 11 or reduction in the capacity for cooling the coolant in the low-pressure side heat exchanger 16.

For example, the controller 40 controls the operation of at least one of the high-temperature side pump 21 and the flow-rate adjustment valve 24 such that as the temperature of the engine 23 becomes higher, the flow rate of the coolant flowing through the engine 23 increases.

Thus, when the temperature of the engine 23 is low, the flow rate of the coolant flowing through the engine 23 is decreased to raise an increase in the temperature of the engine 23. As the temperature of the engine 23 becomes higher, the flow rate of the coolant flowing through the engine 23 is increased, thus making it possible to reduce the increase in the temperature of the engine 23.

Second Embodiment

Figure 3:
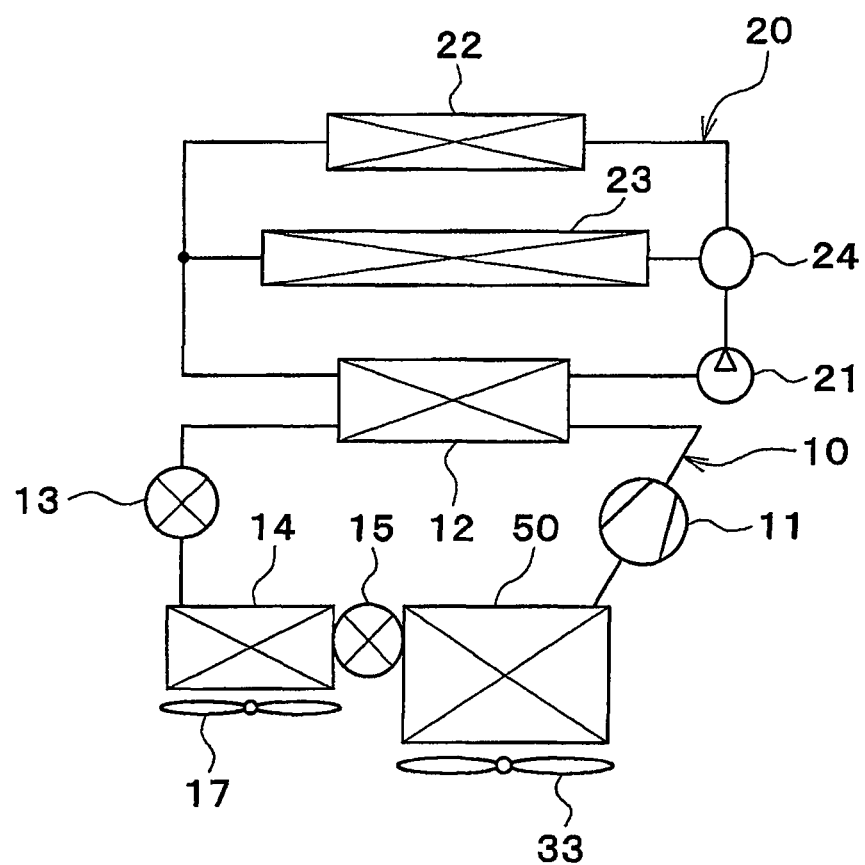
FIG. 3 is an entire configuration diagram showing a refrigeration cycle device in a second embodiment.

In the above-mentioned embodiment, the low-pressure side heat exchanger 16 and the cooler core 32 exchange heat between the low-pressure refrigerant and the air to be blown to the vehicle interior. Meanwhile, in the present embodiment, as shown in FIG. 3, the low-pressure side heat exchanger 50 exchanges heat between the low-pressure refrigerant and the air to be blown into the vehicle interior.

That is, in the above-mentioned embodiment, the low-pressure side heat exchanger 16 causes the low-pressure side refrigerant in the refrigeration cycle 10 to indirectly absorb heat from the air to be blown into the vehicle interior. In the present embodiment, the low-pressure side heat exchanger 50 causes the low-pressure side refrigerant in the refrigeration cycle 10 to directly absorb heat from the air to be blown into the vehicle interior.

The low-pressure side heat exchanger 50 is an evaporator that evaporates a low-pressure refrigerant flowing out of the second expansion valve 15 by exchanging heat between the low-pressure refrigerant and the air to be blown into the vehicle interior. The low-pressure side heat exchanger 50 is a low-temperature side heat medium heat exchanger that cools the air to be blown into the vehicle interior by exchanging heat between the low-pressure refrigerant flowing out of the second expansion valve 15 and the air to be blown into the vehicle interior.

The present embodiment can also exhibit the same functions and effects as the above-mentioned embodiment.

Third Embodiment

Figure 4:
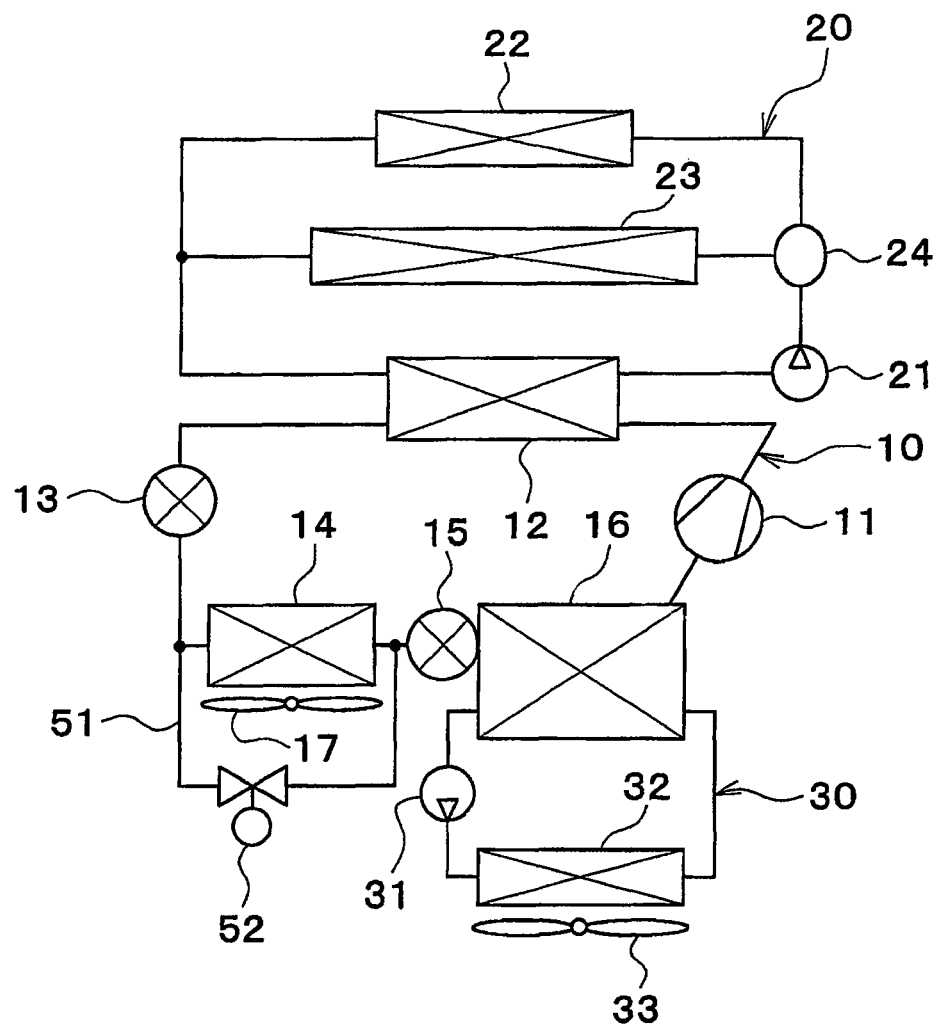
FIG. 4 is an entire configuration diagram showing a refrigeration cycle device in a third embodiment.

As shown in FIG. 4, the refrigeration cycle 10 in the present embodiment includes a bypass passage 51 and a bypass flow-rate adjustment valve 52.

The bypass passage 51 forms a refrigerant flow passage through which the refrigerant flows while bypassing the exterior heat exchanger 14. The bypass flow-rate adjustment valve 52 is an opening-degree adjustment valve that adjusts an opening degree of the flow passage in the bypass passage 51. The bypass flow-rate adjustment valve 52 adjusts the flow rate of a refrigerant flowing through the exterior heat exchanger 14 by adjusting the flow rate of the refrigerant flowing through the bypass passage 51. The bypass flow-rate adjustment valve 52 is a bypass adjusting portion that adjusts the flow-rate ratio of a high-pressure side refrigerant or a low-pressure side refrigerant with respect to the exterior heat exchanger 14 and the bypass passage 51. The operation of the bypass flow-rate adjustment valve 52 is controlled by the controller 40.

The bypass flow-rate adjustment valve 52 increases the flow rate of the refrigerant flowing through the bypass passage 51 by increasing the opening degree of the bypass passage 51. Consequently, the flow rate of the refrigerant flowing through the exterior heat exchanger 14 is decreased, thus reducing the heat exchange amount in the exterior heat exchanger 14.

Therefore, the bypass flow-rate adjustment valve 52 is a heat exchange amount adjusting portion that adjusts the heat exchange amount in the exterior heat exchanger 14. Specifically, the bypass flow-rate adjustment valve 52 is a heat-absorption amount adjusting portion that adjusts a heat absorption amount of heat absorbed by the low-pressure side refrigerant from the outside air at the exterior heat exchanger 14 in the heat absorption mode.

In addition, the present embodiment can adjust the heat exchange amount of the exterior heat exchanger 14, like the above-mentioned embodiments.

Fourth Embodiment

Figure 5:
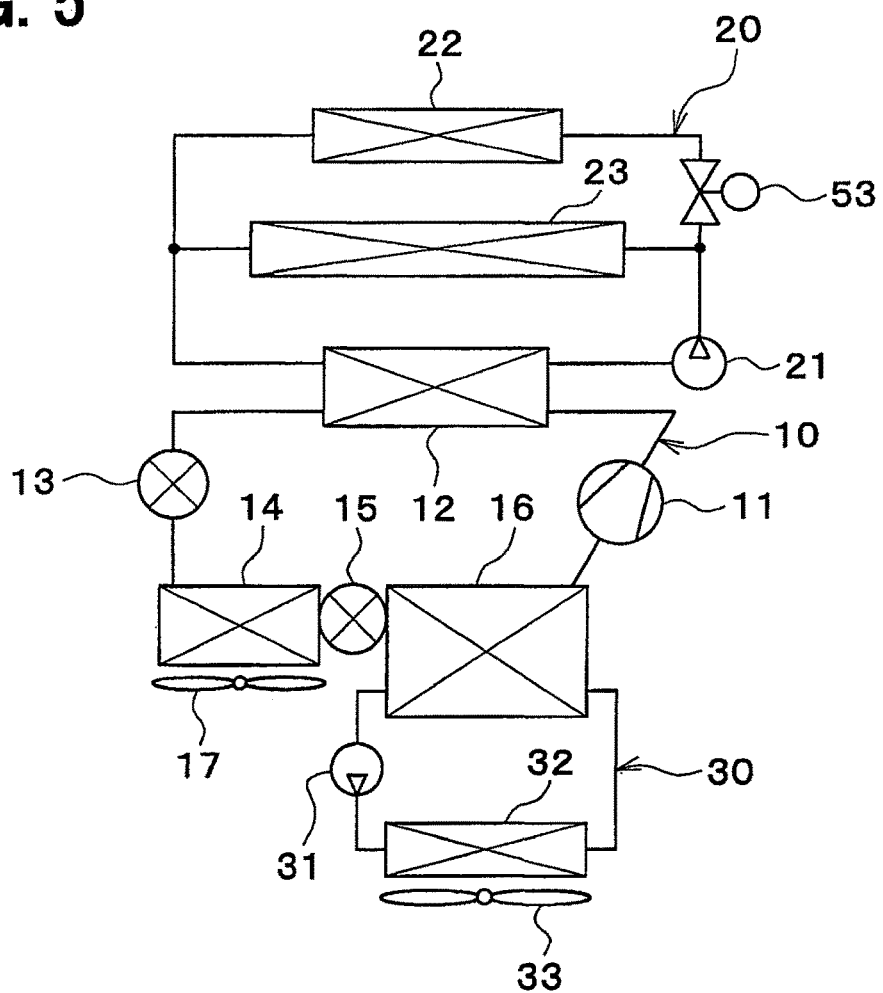
FIG. 5 is an entire configuration diagram showing a refrigeration cycle device in a fourth embodiment.

In the above-mentioned embodiments, the flow-rate adjustment valve 24 adjusts a flow-rate ratio of the coolant flowing through the heater core 22 to the coolant flowing through the engine 23. In the present embodiment, as shown in FIG. 5, a heater-core side shut-off valve 53 adjusts the flow-rate ratio of the coolant flowing through the heater core 22 to the coolant flowing through the engine 23.

The heater-core side shut-off valve 53 is an on/off valve that opens and closes a coolant flow passage on the side of the heater core 22 in the high-temperature coolant circuit 20. The heater-core side shut-off valve 53 is a supply ratio adjusting portion that adjusts a supply ratio of heat of the high-pressure side refrigerant in the refrigeration cycle 10 with respect to the engine 23 and the heater core 22. The heater-core side shut-off valve 53 is a heat exchange amount adjusting portion that adjusts the heat exchange amount in the heater core 22.

The heater-core side shut-off valve 53 has its operation controlled by a control signal output from the controller 40.

The heater-core side shut-off valve 53 closes a coolant flow passage on the side of the heater core 22 in the high-temperature coolant circuit 20 during the warming-up of the engine 23. Thus, the flow of the coolant to the heater core 22 is shut off, so that the entire amount of the coolant discharged from the high-temperature side pump 21 flows through the engine 23. Consequently, the warming-up capacity of the engine 23 can be improved.

Fifth Embodiment

Figure 6:
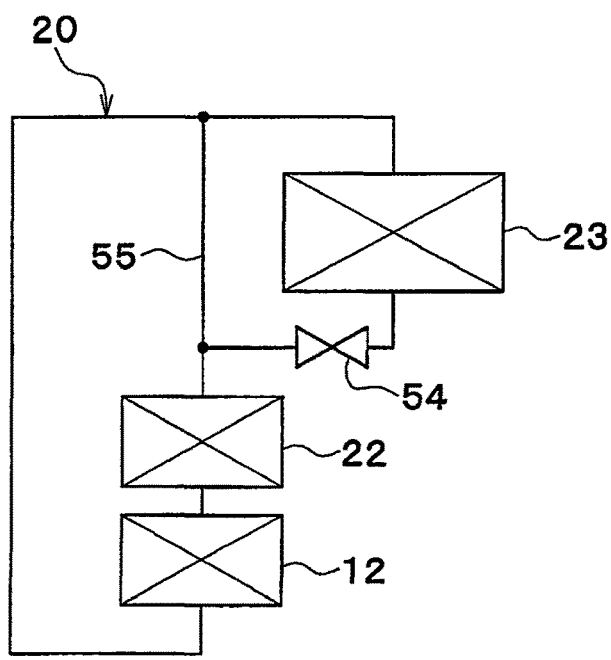
FIG. 6 is an entire configuration diagram showing a refrigeration cycle device in a fifth embodiment.

In the above-mentioned fourth embodiment, the high-temperature coolant circuit 20 includes the heater-core side shut-off valve 53 that opens and closes the coolant flow passage on the side of the heater core 22. In the present embodiment, as shown in FIG. 6, the high-temperature coolant circuit 20 includes an engine side shut-off valve 54 that opens and closes a coolant flow passage on the side of the engine 23.

The engine 23 is disposed in series with the heater core 22 in the coolant flow in the high-temperature coolant circuit 20. The high-temperature coolant circuit 20 includes an engine bypass passage 51. The engine bypass passage 55 forms a coolant flow passage through which the coolant flows while bypassing the engine 23.

The engine side shut-off valve 54 is an on/off valve that opens and closes the coolant flow passage on the side of the engine 23 in the high-temperature coolant circuit 20. The engine side shut-off valve 54 is a temperature-adjustment flow rate adjusting portion that adjusts the flow rate of the coolant flowing through the engine 23. The engine side shut-off valve 54 is a supply ratio adjusting portion that adjusts a supply ratio of heat of the high-pressure side refrigerant in the refrigeration cycle 10 with respect to the engine 23 and the heater core 22. The operation of the engine side shut-off valve 54 is controlled by the controller 40.

The engine side shut-off valve 54 decreases an opening degree of the engine bypass passage 55, thereby reducing the flow rate of the coolant flowing through the engine 23. Therefore, the flow rate of the coolant flowing through the engine 23 can be adjusted.

Sixth Embodiment

Figure 7:
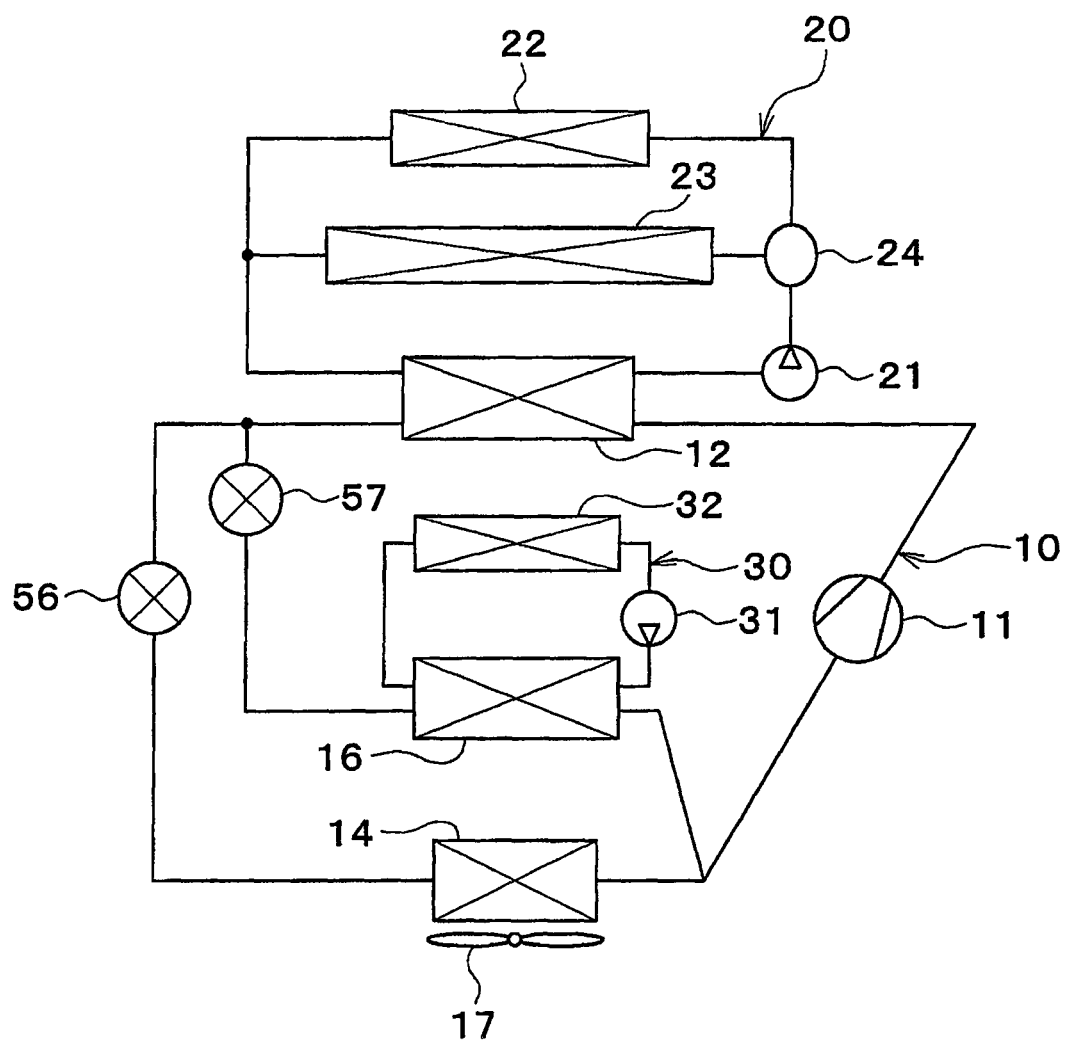
FIG. 7 is an entire configuration diagram showing a refrigeration cycle device in a sixth embodiment.

As shown in FIG. 7, in the present embodiment, the exterior heat exchanger 14 and the low-pressure side heat exchanger 16 are disposed in parallel with each other in the refrigerant flow within the refrigeration cycle 10.

The refrigeration cycle 10 includes a first expansion valve 56 and a second expansion valve 57. The first expansion valve 56 is a first decompression device that decompresses and expands a liquid-phase refrigerant flowing out of the high-pressure side heat exchanger 12 into the exterior heat exchanger 14. The second expansion valve 57 is a second decompression device that decompresses and expands a liquid-phase refrigerant flowing out of the high-pressure side heat exchanger 12 into the low-pressure side heat exchanger 16.

The liquid-phase refrigerant flowing out of the high-pressure side heat exchanger 12 is branched into and flows through the side of the first expansion valve 56 and the side of the second expansion valve 57. The refrigerant decompressed by the first expansion valve 56 flows into the exterior heat exchanger 14. The refrigerant decompressed by the second expansion valve 57 flows into the low-pressure side heat exchanger 16. The gas-phase refrigerant evaporated at the exterior heat exchanger 14 and the gas-phase refrigerant evaporated at the low-pressure side heat exchanger 16 are merged together to be drawn into the compressor 11.

The first expansion valve 56 and the second expansion valve 57 are electric variable throttle mechanisms. The operations of the first expansion valve 56 and the second expansion valve 57 are controlled by the controller 40.

The controller 40 controls a throttle opening degree of at least one of the first expansion valve 56 and the second expansion valve 57, thereby adjusting the flow-rate ratio of the refrigerant flowing through the exterior heat exchanger 14 to the refrigerant flowing through the low-pressure side heat exchanger 16. In this way, the heat absorption amount of heat absorbed by the low-pressure side refrigerant from the outside air in the exterior heat exchanger 14 can be adjusted.

Figure 8:
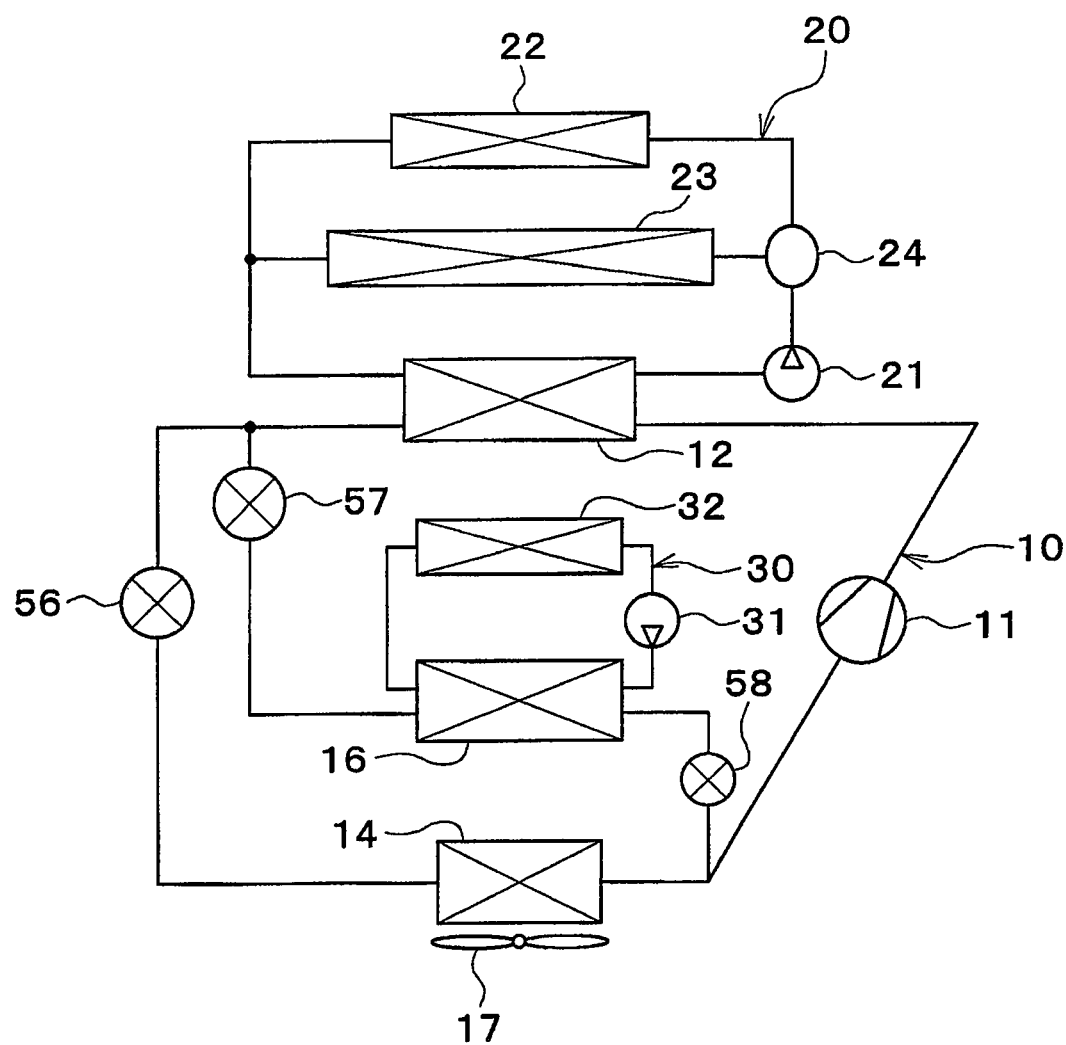
FIG. 8 is an entire configuration diagram showing a modification of the refrigeration cycle device in the sixth embodiment.

Like a modification shown in FIG. 8, the refrigeration cycle 10 may include a third expansion valve 58 that decompresses and expands the gas-phase refrigerant evaporated at the low-pressure side heat exchanger 16. The third expansion valve 58 is an electric variable throttle mechanism. The operation of the third expansion valve 58 is controlled by the controller 40.

In the modification, the gas-phase refrigerant evaporated at the exterior heat exchanger 14 and the gas-phase refrigerant decompressed and expanded at the third expansion valve 58 are merged together to be drawn into the compressor 11.

By providing the third expansion valve 58, the refrigerant pressure of the low-pressure side heat exchanger 16 can be made higher than the refrigerant pressure in the exterior heat exchanger 14. Thus, when the outside air temperature is 0° C. or lower, the coolant temperature in the low-temperature coolant circuit 30 is decreased to 0° C. or lower, thus making it possible to suppress occurrence of frost in the cooler core 32.

Other Embodiments

The above-mentioned embodiments can be combined together as appropriate. Various modifications and changes can be made to the above-mentioned embodiments, for example, in the following way.

(1) A shutter may be disposed in the vicinity of the exterior heat exchanger 14. The shutter is driven to open and close by an electric actuator. The operation of the electric actuator is controlled by the controller 40.

The shutter adjusts an opening degree of the passage for the outside air flowing through the exterior heat exchanger 14. That is, the shutter is a heat exchange amount adjusting portion that adjusts the heat exchange amount in the exterior heat exchanger 14 by adjusting the flow rate of the outside air flowing through the exterior heat exchanger 14. Specifically, the shutter is a heat-absorption amount adjusting portion that adjusts the heat absorption amount of heat absorbed by the low-pressure side refrigerant from the outside air at the exterior heat exchanger 14 in the heat absorption mode.

For example, by decreasing the opening degree of the shutter 41, the flow rate of the outside air flowing through the exterior heat exchanger 14 can be decreased. Thus, the heat exchange amount in the exterior heat exchanger 14 can be reduced.

(2) A pump for the heater core 22 and a pump for the engine 23 may be provided in the high-temperature coolant circuit 20. The pump for the heater core 22 and the pump for the engine 23 are supply ratio adjusting portions that adjust a supply ratio of heat of the high-pressure side refrigerant in the refrigeration cycle 10 with respect to the engine 23 and the heater core 22.

That is, the controller 40 independently controls the rotational speed of the pump for the heater core 22 and the rotational speed of the pump for the engine 23, thereby making it possible to adjust the flow-rate ratio of the coolant flowing through the heater core 22 to the coolant flowing through the engine 23.

(3) In the above-mentioned embodiments, the engine 23 is disposed as the temperature-adjustment target device in the high-temperature coolant circuit 20. Alternatively, a device that cannot exhibit its function unless a predetermined temperature is reached (for example, an EGR cooler), a device that has its performance enhanced with increasing temperature (for example, a lithium ion battery), or the like may be disposed as the temperature-adjustment target device.

(4) Although in each of the above-mentioned embodiments, the coolant is used as the heat medium for adjusting the temperature of the temperature-adjustment target device, various kinds of media, such as oil, may be used as the heat medium.

A nanofluid may be used as the heat medium. The nanofluid is a fluid into which nanoparticles, each nanoparticle having a diameter of the order of nanometer, are mixed. By mixing the nanoparticles into the heat medium, the following functions and effects can be obtained, in addition to the function and effect of making an antifreezing fluid by decreasing a freezing point, like a coolant using ethylene glycol.

That is, the mixture of the nanoparticles in the heat medium can achieve the functions and effects of improving the thermal conductivity in a specific temperature range, increasing the thermal capacity of the heat medium, preventing corrosion of metal pipes and degradation of rubber pipes, and enhancing the fluidity of the heat medium at an ultralow temperature.

These functions and effects are varied depending on the configuration, shape, and blending ratio of the nanoparticles, and additive material.

Thus, the heat medium can improve its thermal conductivity, so that as compared to the coolant using ethylene glycol, the equivalent cooling efficiency can be obtained even when using a small amount of the heat medium.

The heat medium can also improve its thermal capacity and thereby can increase a cold storage amount due to sensible heat of the heat medium itself.

By increasing the cold storage amount, the temperature adjustment, including cooling and heating, of a device using the cold storage can be performed for some period of time even though the compressor 11 is not operated, which enables power saving of the vehicle refrigeration cycle device.

An aspect ratio of the nanoparticle is preferably 50 or more. This is because such an aspect ratio can achieve the adequate thermal conductivity. Note that the aspect ratio of the nanoparticle is a shape index indicating the ratio of the width to the height of the nanoparticle.

Nanoparticles suitable for use include any one of Au, Ag, Cu, and C. Examples of usable constituent atoms of the nanoparticles include Au nanowires, a Ag nanowire, a carbon nanotube (CNT), a graphene, graphite core-shell nanoparticles, a Au nanoparticle-containing CNT, and the like.

CNT refers to a carbon nanotube. The graphite core-shell nanoparticle is a particle body having a structure, such as a carbon nanotube, enclosing the above-mentioned atom.

(5) In the refrigeration cycle 10 of each of the above-mentioned embodiments, fluorocarbon refrigerant is used as the refrigerant. However, the kind of refrigerant is not limited thereto, and may be natural refrigerant, such as carbon dioxide, a hydrocarbon-based refrigerant, and the like.

The refrigeration cycle 10 in each of the above-mentioned embodiments configures a subcritical refrigeration cycle in which a high-pressure side refrigerant pressure does not exceed the critical pressure of the refrigerant, but may configure a super-critical refrigeration cycle in which a high-pressure side refrigerant pressure exceeds the critical pressure of the refrigerant.

(6) Although the above-mentioned embodiments have described the refrigeration cycle device used in vehicles, the refrigeration cycle device is not limited thereto, and for example, the refrigeration cycle device of the above embodiment can be modified to a stationary type refrigeration cycle device.

What is claimed is:

1. A refrigeration cycle device comprising:
   a high-pressure side heat exchanger that causes a high-pressure side refrigerant to dissipate heat;
   a low-pressure side heat exchanger that causes a low-pressure side refrigerant to directly or indirectly absorb heat from air which is to be blown into a space;
   a temperature-adjustment target device to be temperature-adjusted with heat of the high-pressure side refrigerant;
   a heat medium circuit in which a heat medium circulates between the high-pressure side heat exchanger and the temperature-adjustment target device;
   a flow rate adjusting pump configured to adjust a flow rate of the heat medium flowing through the high-pressure side heat exchanger;
   an exterior heat exchanger that exchanges heat between the high-pressure side refrigerant or the low-pressure side refrigerant and outside air;
   an operation mode switch that is configured to switch between a heat dissipation mode in which the high-pressure side refrigerant dissipates heat into the outside air in the exterior heat exchanger, and a heat absorption mode in which the low-pressure side refrigerant absorbs heat from the outside air in the exterior heat exchanger;
   a cooling request operation switch configured to be operated by an occupant to request cooling of air to be blown into the space, by using the low-pressure side heat exchanger; and
   a controller configured to control an operation of the operation mode switch to perform the heat absorption mode when the cooling request operation switch operates to request cooling of the air to be blown into the space and the temperature-adjustment target device needs to be warmed up, and configured to control an operation of the flow rate adjusting pump such that the flow rate of the heat medium flowing through the high-pressure side heat exchanger is decreased as a temperature of the heat medium flowing into the high-pressure side heat exchanger becomes higher.

2. The refrigeration cycle device according to claim 1, wherein
   the controller is configured to reduce a heat absorption amount absorbed by the low-pressure side refrigerant from outside air with elapse of time after the operation mode switch switches to the heat absorption mode.

3. The refrigeration cycle device according to claim 1, wherein
the controller controls an operation of the operation mode switch to switch to the heat dissipation mode when a predetermined time elapses after the operation mode switch switches to the heat absorption mode.

4. The refrigeration cycle device according to claim 1, further comprising:
a heating heat exchanger configured to heat air to be blown into the space, by using heat of the high-pressure side refrigerant; and
a supply ratio adjusting valve configured to adjust a supply ratio of heat of the high-pressure side refrigerant with respect to the temperature-adjustment target device and the heating heat exchanger, wherein
the controller controls an operation of the supply ratio adjusting valve to increase the supply ratio of heat of the high-pressure side refrigerant with respect to the heating heat exchanger with elapse of time after the operation mode switch switches to the heat absorption mode.

5. The refrigeration cycle device according to claim 1, further comprising:
a heating heat exchanger that heats air to be blown into the space, by using heat of the high-pressure side refrigerant; and
a heat exchange amount adjusting valve configured to adjust a heat exchange amount in the heating heat exchanger, wherein
the controller controls an operation of the heat exchange amount adjusting valve to increase the heat exchange amount in the heating heat exchanger with elapse of time after the operation mode switch switches to the heat absorption mode.

6. The refrigeration cycle device according to claim 1, further comprising:
a heating heat exchanger that heats air to be blown into the space, by using heat of the high-pressure side refrigerant; and
a heat exchange amount adjusting valve configured to adjust a heat exchange amount in the heating heat exchanger, wherein
the controller controls an operation of at least one of the flow rate adjusting pump and the heat exchange amount adjusting valve such that a rank of an absolute heat exchange amount of the heating heat exchanger rises in comparison among absolute heat exchange amounts of the high-pressure side heat exchanger, the exterior heat exchanger, the low-pressure side heat exchanger, and the heating heat exchanger with elapse of time after the operation mode switch switches to the heat absorption mode.

7. The refrigeration cycle device according to claim 1, further comprising
a heating heat exchanger configured to heat air to be blown into the space, by using heat of the high-pressure side refrigerant
wherein
the controller is configured to decrease a rank of an absolute heat exchange amount absorbed by the low-pressure side refrigerant from the outside air in the exterior heat exchanger in comparison among absolute heat exchange amounts in the high-pressure side heat exchanger, the exterior heat exchanger, the low-pressure side heat exchanger, and the heating heat exchanger with elapse of time after the operation mode switch switches to the heat absorption mode.

8. The refrigeration cycle device according to claim 1, further comprising:
a heating heat exchanger configured to heat air to be blown into the space, by using heat of the high-pressure side refrigerant; and
a low-temperature side pump configured to adjust a heat exchange amount in the low-pressure side heat exchanger, wherein
the controller controls an operation of the low-temperature side pump such that a rank of an absolute heat exchange amount of the low-pressure side heat exchanger rises in comparison among absolute heat exchange amounts of the high-pressure side heat exchanger, the exterior heat exchanger, the low-pressure side heat exchanger, and the heating heat exchanger with elapse of time after the operation mode switch switches to the heat absorption mode.

9. The refrigeration cycle device according to claim 1, wherein
the controller controls a refrigerant discharge capacity of a compressor in accordance with a heat exchange amount required for the low-pressure side heat exchanger, and
in the heat absorption mode, the controller is configured to reduce a heat absorption amount absorbed by the low pressure side refrigerant from the outside air in the exterior heat exchanger when a heat exchange amount in the low-pressure side heat exchanger is determined to be less than the heat exchange amount required for the low-pressure side heat exchanger, even when the compressor is operated at a maximum refrigerant discharge capacity.

10. The refrigeration cycle device according to claim 1, wherein
the controller controls a refrigerant discharge capacity of a compressor in accordance with a heat exchange amount required for the low-pressure side heat exchanger, and
in the heat absorption mode, the controller controls an operation of the operation mode switch to switch to the heat dissipation mode when a heat exchange amount in the low-pressure side heat exchanger is determined to be less than the heat exchange amount required for the low-pressure side heat exchanger, even when the compressor is operated at a maximum refrigerant discharge capacity.

11. The refrigeration cycle device according to claim 2, wherein
the operation mode is a first expansion valve and a second expansion valve that are configured to:
decompress respectively the refrigerant flowing into the exterior heat exchanger and the refrigerant flowing from the exterior heat exchanger into the low-pressure side heat exchanger; and
adjust a heat absorption amount of heat absorbed by the low-pressure side refrigerant from the outside air in the exterior heat exchanger, and
the controller controls at least one of the first expansion valve and the second expansion valve to reduce the heat absorption amount absorbed by the low-pressure side refrigerant from outside air with elapse of time after the heat dissipation mode is switched to the heat absorption mode.

12. The refrigeration cycle device according to claim 1, further comprising a blower that adjusts a flow speed of the outside air flowing into the exterior heat exchanger, wherein the blower adjusts a heat absorption amount of heat absorbed by the low-pressure side refrigerant from the outside air in the exterior heat exchanger, and the controller controls an operation of the blower to reduce the heat absorption amount absorbed by the low-pressure side refrigerant from outside air with elapse of time after the operation mode switch switches to the heat absorption mode.

13. The refrigeration cycle device according to claim 1, wherein the exterior heat exchanger and the low-pressure side heat exchanger are connected in parallel with each other in a flow of the refrigerant, the operation mode switch includes:
  a first decompression valve that decompresses the refrigerant flowing into the exterior heat exchanger; and
  a second decompression valve that decompresses the refrigerant flowing into the low-pressure side heat exchanger, wherein the control unit controls at least one of the first decompression valve and the second decompression valve to adjust a flow-rate ratio of the refrigerant flowing through the exterior heat exchanger to the refrigerant flowing through the low-pressure side heat exchanger.

14. The refrigeration cycle device according to claim 2, further comprising:
  a bypass passage through which the high-pressure side refrigerant or the low-pressure side refrigerant flows while bypassing the exterior heat exchanger; and
  a bypass adjusting valve that adjusts a flow-rate ratio of the high-pressure side refrigerant or the low-pressure side refrigerant with respect to the exterior heat exchanger and the bypass passage.

15. The refrigeration cycle device according to claim 1, wherein the controller controls an operation of the flow rate adjusting pump such that the flow rate of the heat medium flowing through the temperature-adjustment target device is increased as a temperature of the temperature-adjustment target device becomes higher.

16. A refrigeration cycle device comprising:
  a high-pressure side heat exchanger that causes a high-pressure side refrigerant to dissipate heat;
  a low-pressure side heat exchanger that causes a low-pressure side refrigerant to directly or indirectly absorb heat from air which is to be blown into a space;
  a temperature-adjustment target device to be temperature-adjusted with heat of the high-pressure side refrigerant;
  a heat medium circuit in which a heat medium circulates between the high-pressure side heat exchanger and the temperature-adjustment target device;
  an exterior heat exchanger that exchanges heat between the high-pressure side refrigerant or the low-pressure side refrigerant and outside air;
  an operation mode switch configured to switch between a heat dissipation mode in which the high-pressure side refrigerant dissipates heat into the outside air in the exterior heat exchanger, and a heat absorption mode in which the low-pressure side refrigerant absorbs heat from the outside air in the exterior heat exchanger;
  a flow rate adjusting valve configured to adjust a flow rate of the heat medium flowing through the temperature-adjustment target device;
  a cooling request operation switch configured to be operated by an occupant to request cooling of air to be blown into the space, by using the low-pressure side heat exchanger; and
  a controller configured
    to control an operation of the operation mode switch to perform the heat absorption mode when the cooling request operation switch operates to request cooling of the air to be blown into the space and the temperature-adjustment target device needs to be warmed up, and
    to control an operation of the flow rate adjusting valve such that the flow rate of the heat medium flowing through the temperature-adjustment target device is increased as a temperature of the temperature-adjustment target device becomes higher.

17. A refrigeration cycle device comprising:
  a high-pressure side heat exchanger that causes a high-pressure side refrigerant to dissipate heat;
  a low-pressure side heat exchanger that causes a low-pressure side refrigerant to directly or indirectly absorb heat from air which is to be blown into a space;
  a temperature-adjustment target device to be temperature-adjusted with heat of the high-pressure side refrigerant;
  an exterior heat exchanger that exchanges heat between the high-pressure side refrigerant or the low-pressure side refrigerant and outside air;
  a bypass passage through which the high-pressure side refrigerant or the low-pressure side refrigerant flows while bypassing the exterior heat exchanger;
  a bypass adjusting valve that adjusts a flow-rate ratio of the high-pressure side refrigerant or the low-pressure side refrigerant with respect to the exterior heat exchanger and the bypass passage;
  an operation mode switch that is configured to switch between a heat dissipation mode in which the high-pressure side refrigerant dissipates heat into the outside air in the exterior heat exchanger, and a heat absorption mode in which the low-pressure side refrigerant absorbs heat from the outside air in the exterior heat exchanger;
  a cooling request operation switch configured to be operated by an occupant to request cooling of air to be blown into the space, by using the low-pressure side heat exchanger; and
  a controller configured to control an operation of the operation mode switch to perform the heat absorption mode when the cooling request operation switch operates to request cooling of the air to be blown into the space and the temperature-adjustment target device needs to be warmed up.

18. The refrigeration cycle device according to claim 17, wherein the bypass adjusting valve is configured to adjust a heat absorption amount of heat absorbed by the low-pressure side refrigerant from the outside air in the exterior heat exchanger, and the controller controls an operation of the bypass adjusting valve to reduce the heat absorption amount with elapse of time after the operation mode switch switches to the heat absorption mode.

19. The refrigeration cycle device according to claim 17, further comprising:
  a heating heat exchanger configured to heat air to be blown into the space, by using heat of the high-pressure side refrigerant, wherein the bypass adjusting valve is configured to adjust a heat absorption amount of heat absorbed by the low-pressure side refrigerant from the outside air in the exterior heat exchanger, and the controller controls an operation of the bypass adjusting valve such that a rank of an absolute heat exchange amount of the exterior heat exchanger descends in comparison among absolute heat exchange amounts of the high-pressure side heat exchanger, the exterior heat exchanger, the low-pressure side heat exchanger, and the heating heat exchanger with elapse of time after the operation mode switch switches to the heat absorption mode.

20. The refrigeration cycle device according to claim 17, wherein the bypass adjusting valve is configured to adjust a heat absorption amount of heat absorbed by the low-pressure side refrigerant from the outside air in the exterior heat exchanger, the controller controls a refrigerant discharge capacity of a compressor in accordance with a heat exchange amount required for the low-pressure side heat exchanger, and in the heat absorption mode, the controller controls an operation of the bypass adjusting valve to reduce the heat absorption amount in the exterior heat exchanger when a heat exchange amount in the low-pressure side heat exchanger is determined to be less than the heat exchange amount required for the low-pressure side heat exchanger, even when the compressor is operated at maximum refrigerant discharge capacity.

\* \* \* \* \*